Patented Mar. 1, 1949

2,462,912

UNITED STATES PATENT OFFICE 2,462,912

INSULATING COATING HAVING HIGH DIELECTRIC STRENGTH

Howard E. Smith and Donald M. O'Halloran, Briarcliff Manor, N. Y., assignors to Centro Research Laboratories, Incorporated, Scarborough on Hudson, N. Y., a corporation of New York No Drawing. Application December 22, 1945, Serial No. 637,115

13 Claims. (Cl. 201—76)

Our invention relates to an improved coating composition and to improved electrical conductors with insulating coatings.

Heretofore insulated resistance wires were of three general types; first, wire with insulating coating of phenolic resin; second, wire coated with a ceramic spray; and third, wire coated with a thermoplastic material. For many uses these products are satisfactory, but it is desired to produce an improved product with longer life and improved properties. For example, the phenolic coatings have low resistance to heat aging, and relatively poor shelf-life; the ceramic coatings are not moisture proof, are fragile, are not resistant to abrasion, and have a low dielectric strength; and the thermoplastic coatings deform at low temperatures, are soluble in various chemical solvents, and have a relatively low dielectric strength.

It is the object of this invention to produce a composition which when applied to an electrical conducting apparatus produces a superior insulated electrical device.

More specifically it is an object of this invention to produce a composition which has high dielectric strength, increased resistance to moisture and water, and superior resistance to heat aging and having superior shelf and storage life.

It is a further object of this invention to produce a composition which can be applied to the wire in fewer passes through the coating bath and impart these superior properties to the wire.

It is still a further object of this invention to produce a coated resistance wire of higher dielectric strength than heretofore produced.

It is also an object of this invention to produce an insulated resistance wire with increased moisture and water resistance.

Further objects of this invention are to produce insulated resistance wire which is resistant to heat aging and has an improved shelf-life, and to produce an insulated resistance wire in which the tensile strength of the insulating coating does not decrease with age.

Because of the high dielectric strength of the coating it is possible to apply a thinner coating on the wire and thus attain closer spacing of the turns. A very important object of the present invention is therefore to produce an insulated wire for the production of insulated windings which because of the superior dielectric strength and thinner coating on the wire can be more compactly wound to produce a winding containing more conducting media per unit of volume which is better insulated and more compact than such coils or windings heretofore produced.

It is still a further object of this invention to produce a coating composition which can be applied at a relatively low temperature and at a greatly increased speed.

An important object of this invention is to produce a resistance wire which is operable at a low temperature of —55° C. or even lower.

A very important object of this invention is to produce a resistance wire which can be operated at temperatures of 175° C. for a long period of time and can operate continuously at temperatures of 150° C. or higher.

The foregoing objects and others ancillary thereto, we prefer to accomplish by preparing a resinous composition which comprises a modified melamine varnish as, for example, a resin composition containing melamine formaldehyde condensation resin, cellulose ether such as ethyl cellulose, and a high fatty acid ester modified alkyd resin such as castor oil-glyceryl-phthalate in a suitable solvent. The ingredients may be present in the following proportions: melamine resin solution (50% solid and 50% solvent) 100 parts, organic solvent soluble ethyl cellulose 2 to 30 parts, fatty acid ester alkyd resin 2 to 20 parts. A solvent, such as xylol is added in suitable proportion.

A preferred composition is as follows: melamine resin solution, as above, 100 parts, ethyl cellulose of low viscosity 5 parts, castor oil-glyceryl-phthalate resin 15 parts, xylol 30 parts.

It is preferred not to use plasticizers with these combinations but plasticizers can be added if desired. The non-volatile alkyd type plasticizers which are compatible with the alkyd resins are preferred if plasticizers are to be added. Such plasticizers may, for example, be the liquid sebacic or succinic glyceryl ester resins.

The cellulose ether to be used is preferably the ethyl cellulose with about 46.8–48.5% ethoxy content having a viscosity of 7–200 centipoises as determined in an 80% toluene and 20% ethanol solution.

Any type of solvent may be used but it is preferred to use such solvents as xylol, butanol, isopropyl alcohol, and mixtures thereof.

Examples of other solvents which may be added are toluene, butyl acetate, butyl cellosolve, cyclo hexanol, amyl alcohol, and so forth.

The coating may be applied in any known way. For example, in coated resistance wire the wire may be wiped with a piece of felt saturated with the varnish composition, or the wire may be passed through a bath of the composition, or a combination of the two processes may be employed. Any other known way of applying the composition can be employed. After applying the coating, it is dried and partially or completely cured. Prior to complete curing, a second, third or more coats may be applied.

The novel features are set forth with particularity in the appended claims. The invention itself, however, together with additional objects and advantages thereof will be best understood by the following description of a specific embodiment thereof.

The wire to be coated, such as a Nichrome wire is first preferably cleaned and degreased. A coating composition such as

| | Parts |
|---|---|
| Melamine resin solution | 100 |
| Ethyl cellulose of low viscosity | 5 |
| Castor oil-glyceryl-phthalate resin | 15 |
| Xylol | 30 | is then applied to the wire, as by wiping it with a felt pad soaked in the composition or by passing the wire through a bath containing the composition. The coated wire is dried at about 200° C. and the process repeated until the desired thickness of coating is obtained. The coated wire may be finally cured at a temperature of from 370° C. to 482° C. The curing cycle depends upon the time to which the wire is subjected to the curing temperature as well as on the curing temperature. If sufficient time is allowed our coatings may be cured at temperatures as low as 70° C. Each pass of the wire through the coating device produces a coating of about 0.0001 inch or 0.1 mil thickness on the wire.

A satisfactory melamine resin solution is one containing 50% melamine formaldehyde resin, 25% xylol and 25% butanol.

The advantages of the present invention are at once apparent from the following comparisons with the prior art.

Our product has a dielectric strength of 1000 to 1500 volts per mil, as compared with a dielectric strength of 300 volts per mil which represents about the best dielectric strength of the insulated conductors of the prior art. These values represent practical averages. The theoretical absolutes compare 2500-3500 for the product of the present invention as against 1000 to 1500 for the products of the prior art.

The product of the present invention has increased water and moisture resistance in practical use because there are less breaks in the coating. The product of the present invention has a markedly higher moisture proof quality as against the product of the prior art.

Our product will withstand 250 hours at 175° C. without substantial insulating deterioration, whereas the phenolic varnish type is injured in 5 hours at 85° C., and the thermoplastic varnish deforms immediately at any temperature over 105° C. A safe operating temperature of 175° C. is possible with our product, whereas for the phenolic and thermoplastic type the safe operating temperature is less than 105° C.

Our product is unaffected by ordinary organic solvents which dissolve the prior thermoplastic type of coating.

The tensile strength of our product does not decrease materially with aging and it has a very good shelf-life. The shelf-life of the phenolic product is limited and notoriously poor due to polymerization and/or condensation in aging and that of the prior thermoplastic product is only fair under high humidity. Furthermore less heat and less time are required to cure our product.

The over all operating temperature of our product is from −55° C. to +175° C. The operating temperature of the phenolic coated wire is considered good (−55 to +105° C.) but it does not even approach this value.

With a phenolic coating of 0.4 mil of thickness and an applied voltage of 125 volts, the required standard is that the wire show no more than 25 breaks per hundred feet. A voltage of 350 volts can be applied to a wire with a 0.2 mil thickness of our composition and it will show a maximum of three breaks per hundred feet. Due to the fact that the thinner coating on our product produces a product which is better insulated, a closer spacing of wire in coils or cores can be obtained.

Another advantage of our composition is that it can be cured at a low temperature (70° C. to 320° C.), whereas the phenolic coatings require relatively high temperatures (370° C. to 482° C).

It is the practice in the art to apply about 0.00013 inch of coating material at a speed of about 70 meters per minute. Eight to twelve passes are considered necessary to obtain a good insulation. With our process, the composition is applied at a speed of 85 meters per minute or even faster (limited only by the tensile strength of the wire) and four to six passes have been found to be sufficient for even the best insulation.

Although we have described certain specific embodiments of our invention, we are aware that many modifications thereof are possible. Our invention, therefore, is not to be restricted except insofar as it is necessitated by the prior art and by the spirit of the appended claims.

We claim:

1. A composition for insulating electrical equipment comprising per 50 parts of a melamine aldehyde resin, 2-20 parts of a fatty acid ester alkyd resin, and 2-30 parts of ethyl cellulose.

2. A composition for insulating electrical resistance wire consisting of 100 parts by weight of a melamine formaldehyde resin solution containing 50% solid, 25% xylol and 25% butanol, 5 parts of ethyl cellulose, 15 parts of castor oil glyceryl phthalate resin, and 30 additional parts of xylol.

3. An insulated resistance element comprising a metallic wire core and an adherent coating thereover comprising a melamine resin, a fatty acid ester alkyd resin, and ethyl cellulose, said coating containing per 50 parts of melamine resin, 2-20 parts of said fatty acid ester alkyd resin and 2-30 parts of said ethyl cellulose.

4. An insulated resistance element comprising a metallic wire core and an adherent coating thereover comprising a composition containing about 50 parts melamine aldehyde resin, 2 to 20 parts of castor oil glyceryl phthalate resin and 2 to 30 parts of ethyl cellulose.

5. A device for use in electrical apparatus comprising at least two closely spaced conducting portions, said conducting portions being separated by a thin layer of an insulating composition consisting essentially of about 2-30 parts of ethyl cellulose, 2-20 parts of a fatty acid alkyd resin and 50 parts of melamine formaldehyde resin.

6. A device for use in electrical apparatus comprising at least two closely spaced conducting portions, said conducting portions being separated by a thin layer of an insulating composition consisting essentially of about 2-30 parts of ethyl cellulose, 2-20 parts of castor oil glyceryl phthalate resin and 50 parts of melamine formaldehyde resin.

7. A device for use in electrical apparatus comprising at least two closely spaced conducting portions, said conducting portions being separated by a layer of about 0.2 mil thickness of an insulating composition consisting essentially of about 2-30 parts of ethyl cellulose, 2-20 parts of a fatty acid alkyd resin and 50 parts of melamine formaldehyde resin.

8. A device for use in electrical apparatus comprising at least two closely spaced conducting portions, said conducting portions being separated by a layer of about 0.2 mil thickness of an insulating composition consisting essentially of about 2-30 parts of ethyl cellulose, 2-20 parts of castor oil glyceryl phthalate resin and 50 parts of melamine formaldehyde resin.

9. A device for use in electrical apparatus comprising at least two closely spaced coils of wire, the coils of said wire being separated by a layer of about 0.2 mil thickness of an insulating composition consisting essentially of about 2-30 parts of ethyl cellulose, 2-20 parts of a fatty acid alkyd resin and 50 parts of melamine formaldehyde resin.

10. A composition according to claim 1 in which the melamine-aldehyde resin is a melamine formaldehyde resin.

11. A composition according to claim 1 in which the modified alkyd resin is a castor oil-glyceryl-phthalate resin.

12. A composition according to claim 1 in which the melamine aldehyde resin is melamine formaldehyde resin and the alkyd resin is castor oil glyceryl-phthalate resin.

13. A composition according to claim 1 in which the melamine aldehyde resin is melamine formaldehyde resin and the alkyd resin is castor oil glyceryl-phthalate resin and in which the composition is dissolved in an alcoholic solvent.

HOWARD E. SMITH.
DONALD M. O'HALLORAN.

REFERENCES CITED

The following references are of record in the file of this patent:

UNITED STATES PATENTS

| Number | Name | Date |
| --- | --- | --- |
| 1,930,932 | Freyman | Oct. 17, 1933 |
| 2,218,474 | Moore | Oct. 15, 1940 |
| 2,356,794 | Peiker | Aug. 29, 1944 |
| 2,364,692 | Cassel | Dec. 12, 1944 |

FOREIGN PATENTS

| Number | Country | Date |
| --- | --- | --- |
| 552,442 | Great Britain | Apr. 8, 1943 |

OTHER REFERENCES

Romieux, "Meet Melamine," pages 25-27 of the Scientific American, July 1944.